United States Patent [19]

Keiler et al.

[11] Patent Number: 4,630,382
[45] Date of Patent: Dec. 23, 1986

[54] DISCHARGE DEVICE FOR GRANULES

[75] Inventors: Manfred Keiler, Neusäss; Uwe Bartsch, Wertingen; Hans-Heinrich Drösemeyer, Batzenhofen; Franz X. Reitsam, Augsburg, all of Fed. Rep. of Germany

[73] Assignee: Hoechst Aktiengesellschaft, Fed. Rep. of Germany

[21] Appl. No.: 678,981

[22] Filed: Dec. 6, 1984

[30] Foreign Application Priority Data

Dec. 9, 1983 [DE] Fed. Rep. of Germany ....... 3344558

[51] Int. Cl.⁴ ............................................. F26B 17/34
[52] U.S. Cl. ...................................... 34/173; 34/178; 414/300
[58] Field of Search ................. 34/173, 178, 171, 166; 414/299, 300

[56] References Cited

U.S. PATENT DOCUMENTS 879,842  2/1908  Swart ..................................... 34/173
893,338  7/1908  MacLeod .............................. 34/173

FOREIGN PATENT DOCUMENTS 123646  4/1918  United Kingdom .................. 34/173

Primary Examiner—Larry I. Schwartz
Attorney, Agent, or Firm—Connolly and Hutz

[57] ABSTRACT

A discharge device for granules from vertical reactors having a plane blower plate with scraper edges has at least one discharge slot with corresponding collecting device fixedly connected to the discharge slot so as to be rotatable with the latter. A static scraping device is arranged between the discharge slot and the collecting device.

5 Claims, 4 Drawing Figures

DISCHARGE DEVICE FOR GRANULES

The present invention relates to a discharge device for granules, especially from vertical reactors for drying, crystallization or solid-state condensation of plastics granules.

It is already known that certain plastics granules tend to adhere and form agglomerates upon drying, and this causes great difficulties in discharging them from the reactor. A number of solutions to the problem of avoiding this agglomerate formation have been proposed.

Stirring the granular mass, as repeatedly recommended in the literature and as described, for example, in German Pat. No. 2,918,675, causes abrasion and dust which always presents a problem in melt spinning, especially to form synthetic filaments.

German Offenlegungsschrift No. 2,559,290 describes a process in which polyester granules are crystallized at temperatures between 220° and 260° C. in order thereby to avoid caking in the downstream solid-state condensation zone. Such high crystallization temperatures however cause hydrolytic degradation of the polyester, since the crystallization markedly retards the diffusion of water out of the polymer. Moreover, even the granules thus pre-crystallized still cake during the solid-state condensation, admittedly to a lesser degree but still to an extent which is troublesome.

German Patent Specification No. 2,558,730 follows a completely different approach; in this, adhesion during drying of the granules is permitted and the granule agglomerate block thus formed is cut away in layers from below and discharged as granules which are once again pourable. The apparatus appropriate for this purpose consists of a simple vertical cylindrical reactor which possesses a plane or conical blower plate which rotates about its vertical axis and extends to near the wall of the vessel, the blower plate having scraper edges on its upper face and being provided with discharge slots.

A precondition for the process described above is that a block of firmly caked granules should be present. On starting up the dryer, a minimum amount of granules must first be caked together in the reactor, or alternatively a caked residual plug is left in the reactor on shut-down.

Accordingly, this process is not suitable for the solid-state condensation of dried polyester or polyamide granules, since with these sufficient caking no longer occurs.

The process according to German Patent Specification No. 2,558,730 is accordingly restricted to caked granules or to process temperatures at which the caking takes place, and gives substantial losses on start-up and shut-down.

It is therefore the object of the present invention to provide a device for drying, crystallization or solid-state condensation of plastics granules by means of vertical reactors, which device permits free choice of the process parameters and works even without solid caking of the granules, but in which the caking or agglomeration is also not troublesome, and which avoids losses on start-up and shut-down.

This object is achieved with a discharge device comprising the vertical reactor having a plane blower plate (2), which on its upper face has scraper edges or pins (11) and is provided with at least one discharge slot (5), and wherein, below each discharge slot, there is located a collecting device (3) which is fixedly connected to the discharge slot (5) and rotates conjointly with the said slot, while a static scraping device (9) is located between the discharge slot (5) and the collecting device (3).

In a preferred embodiment of the discharge slot (5), the latter is provided on its lower face with substantially vertical walls and is thus in the form of a discharge chute.

The blower plate (2) is preferably constructed as a screened plate with more than 10%, and especially preferentially with more than 25%, of free surface area, with the size of hole in the screen plate of course having to be smaller than that of the granules to be processed. On its upper face, the screened plate preferably has loosening devices in the form of fixedly connected pins (11) or other protuberances.

The scraping device (9) is preferably in the form of a static spoke wheel. The vertical distance of this scraper (9), in the upward direction from the end of the discharge chute (6), and in the downward direction from the collecting device (3), is of the order of magnitude of the granule dimensions.

The collecting device (3) essentially consists of a horizontal collecting tray, the width of which is so chosen that the amount of granules produced between two successive scraping sequences can be accommodated.

The dimensions of the discharge slot (5), of the discharge chute (6), of the scraper (9) and of the collecting device (3) are matched to the granule size, i.e. to the angle of repose The figures show a preferred embodiment of the device according to the invention. FIG. 1 shows the lower end of a vertical reactor which can be used either as a dryer and crystallizer or as a solid-state condensation reactor.

Figure 1:
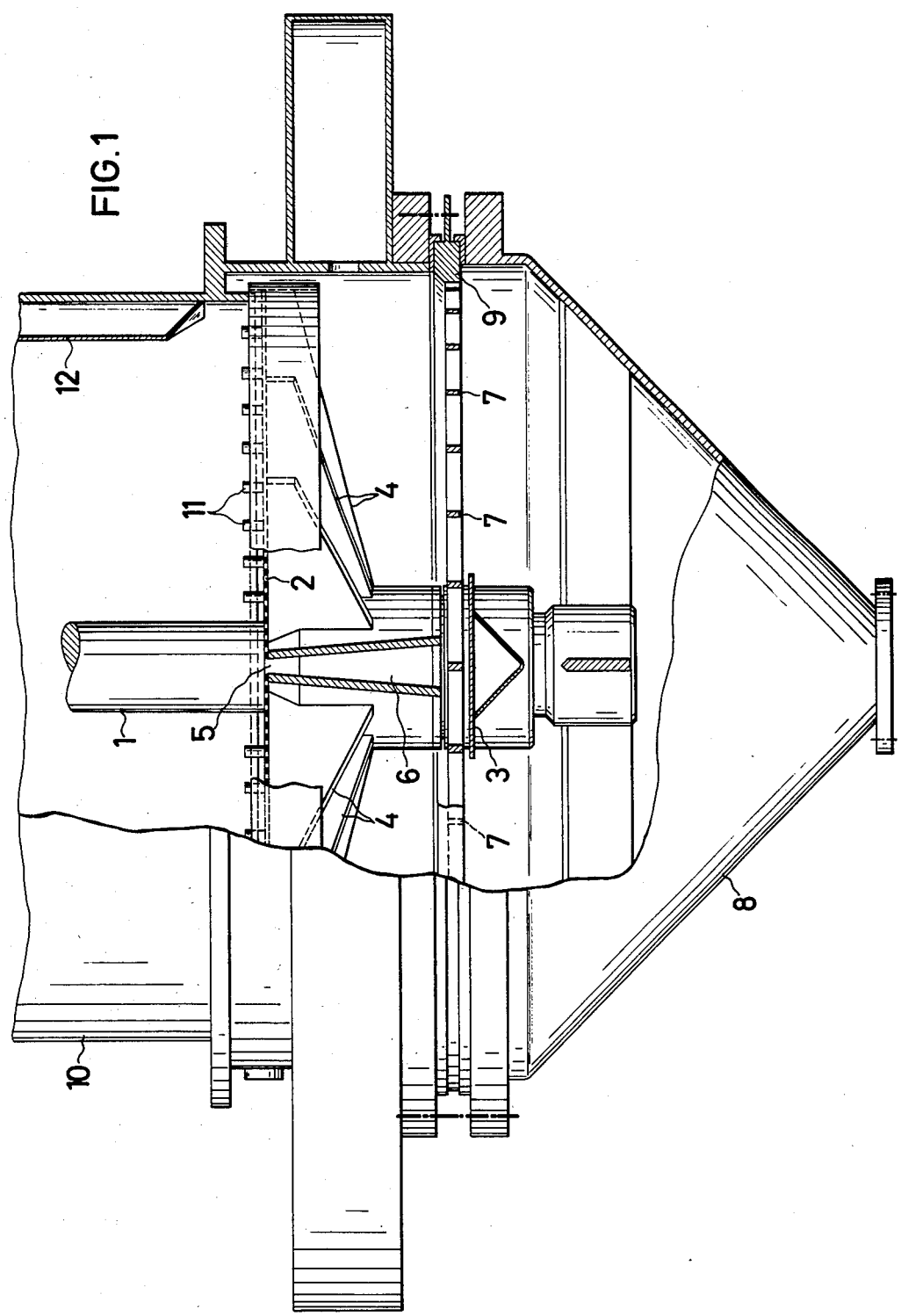
Figure 2:
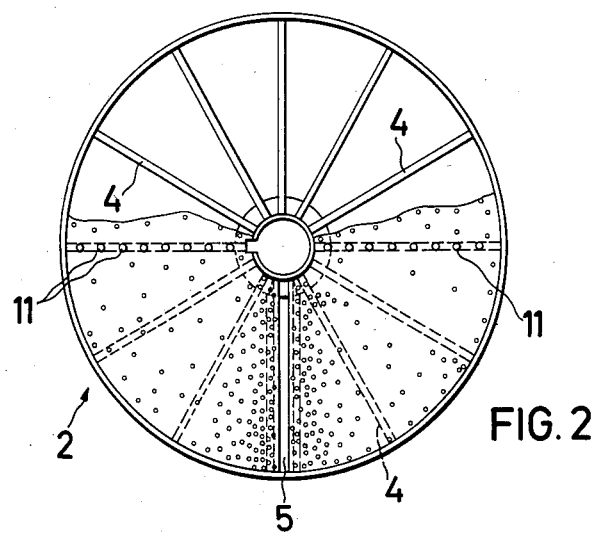
FIG. 2 shows a plan view of the filter plate (2).
Figure 3:
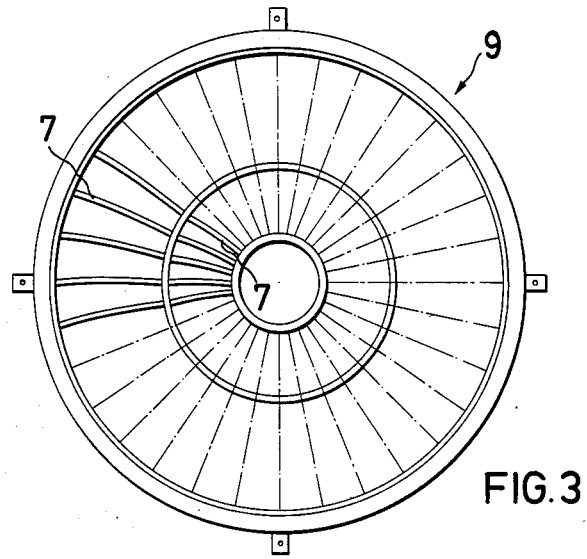
FIG. 3 shows a plan view of the scraper device (9)
Figure 4:
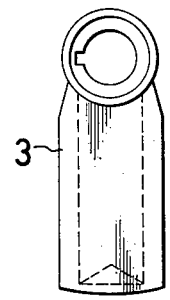
FIG. 4 shows a plan view of the collecting device (3).

The granules are introduced into the reactor (10) through a short tube; in the stationary state, the granules fill the vertical reactor space up to a smoothing bar which sits on the same shaft (1) as the filter plate (2) and the collecting device (3), as is shown in FIG. 4. The screened plate (2) consists of a sieve-like perforated metal sheet and carries stiffening ribs (4) on its lower face. The free-surface area is about 30% and the hole size about 2 mm, the edge length of the granules being 4 mm. The drying gas, mostly purified nitrogen, enters the column of granules through this screened plate (2). Baffles (12) are fixed into the walls of the reactor and prevent the column of granules from rotating with the screened plate (2). On its upper face, the screened plate possesses scraper edges or pins (11) which detach the granules from the lower face of the more or less caked plug of granules. The detached granules then trickle through the discharge slot (5) into the discharge chute (6), the two walls of which diverge in a slightly conical manner. The granules then drop onto the collecting device (3). The heap of granules formed there is thrown down in a precise volumetric manner by the spokes (7) of the static scraping device (9) as the discharge slot (5) and collecting device (3) rotate, and drops through the hopper (8) into the next processing stage. It is therefore important that the collecting device (3) should be large enough to accommodate the amount of granules which arrives between two successive scraping sequences. The vertical distance between the scraper (9) and the discharge chute (6) and collecting device (3), respectively, must be sufficiently large to prevent jamming of the granules.

The feed of granules into the reactor can be effected by a bucket-wheel sluice but in most cases it suffices to supply the granules via a plug-in tube.

The advantage of the device according to the invention is based on the fact that by means of this discharge device both loose heaps of granules and slightly caked or completely agglomerated granules can be discharged from vertical reactors (10). These reactors (10) can accordingly be used as driers, crystallizers and solid-state condensation reactors, even for sensitive polymers in which the choice of process temperature is greatly restricted by the rate of crystallization of the polymers, the rate of diffusion of the water in the polymer and thermal and hydrolytic degradation. A homogeneous residence time spectrum results. The blower plate (2) provides almost ideal gas distribution over the reactor cross-section and hence an almost ideal temperature distribution, with resulting uniformity of the solid state condensed granules.

In the figures and in the text, 1 denotes the shaft, 2 the blower or screened plate, 3 the collecting device, 4 the stiffening ribs, 5 the discharge slot, 6 the discharge chute, 7 the spokes, 8 the hopper, 9 the scraping device, 10 the reactor, 11 the scraper edges or pins and 12 the baffles.

On starting-up the reactor and on emptying it, no start-up and shut-down losses result if, for example, on start-up the discharge of granules is delayed until the steady-state residence time has been reached. The discharge of granules via the device according to the invention is volumetric and further metering devices such as, for example, bucket-wheel sluices, are not needed. The advantages of the device according to the invention also manifest themselves particularly in continuous solid-state condensation apparatuses, where a plurality of reactors of substantially identical construction are arranged in series as driers and condensors. This incorporation of reactors of identical construction facilitates maintenance and spare parts stockholding.

EXAMPLE

A continuously operable installation for solid-state condensation consists of two reactors of identical construction, connected in series and having the following dimensions:

Blower plate (2) (2 mm thick) with holes of 2.0 mm diameter, spaced in a triangular pattern at intervals of 3.5 mm (30% free surface area). A discharge slot with a "sword", mounted below it, to act as a collecting device (3) and avoid granules trickling through. The blower plate (2) and "sword" (3) are fixedly connected and are driven by a shaft (1). The spoke wheel (scraper device 9) has 36 spokes (7) which are slightly curved (to compensate for thermal expansion) and is fixedly connected to the reactor (10). The surface of the chips is levelled by means of smoothing arms. The speed can be increased relative to the main shaft (rotary plate) by means of a plugin shaft. The chips are introduced into the reactor (10) by means of a bucket wheel, and in particular enter through the gas outlet, thereby producing an additional dusting action. Both the bucket wheel downstream of the discharge cone and the bucket wheel in the feed tube provide a gas seal. The $N_2$ used is continuously discharged and purified.

| Diameter 1.5 m | Height of heap | 3.2 m |
|---|---|---|
| | Residence time | about 4.5 hours |
| | Throughput | 1,000 kg of granules per hour. |

The material used was granules of polyethyleneterephthalate which had a specific viscosity of 0.83 in a 1% strength solution in a 3:2 phenol/tetrachloroethane mixture at 25° C., and a carboxyl group content of 15 millimoles/kg; the external dimensions of the granules were $d_1 = 2.5$ mm, $d_2 = 3.5$ mm, $1 = 4.0$ mm, these being so-called noodle granules.

The nitrogen entered the drier at a temperature of 180° C. and left the drier at a temperature of 100° C. The gas throughput was 2 $m_N^3$/kg of polyethyleneterephthalate. The density achieved was 1.385 g/cm$^3$.

Equally good results were obtained on drying with nitrogen entering at a temperature of 140° C. and at a throughput of 3 $m_N^3$/kg of polyester granules. The density achieved was again 1.375 g/cm$^3$.

The solid-state condensation was carried out immediately thereafter under two different conditions:

| 1. Medium solid-state condensation temperature | |
|---|---|
| Gas entry | about 235° C. |
| Amount of gas | about 2500 $m_N^3$/h |
| Final viscosity η spec. = | 1.02 |
| 2. High solid-state condensation temperature | |
| Gas entry | 250° C. |
| Amount of gas | about 2500 $m_N^3$/h |
| (corresponds to 0.75 m/s empty-tube velocity) | |
| Final viscosity η spec. = | 1.12 |

We claim:
1. A device for discharging granulate material comprising a vertically oriented reactor, a horizontally disposed perforated plate rotatably mounted within the reactor, scraper means on an upper surface of the plate constructed and arranged to scrape material charged into the reactor and positioned directly above the plate, at least one narrow discharge slot in the perforated plate for the passage of granulates removed by the scraper means, granulate collecting means directly below the discharge slot connected to rotate at the same rate as the perforated plate, and stationary scraping means positioned between the discharge slot and the granulate collecting means for removing granulates from the granulate collecting means as the perforated plate and the collecting means rotate.

2. A device as in claim 1 including a chute connected to rotate with the perforated plate and arranged to direct granulates from the discharge slot to the granulate connecting means.

3. A device as in claim 1 wherein the percentage of open area of the perforated plate is at least 10%.

4. A device as in claim 3 wherein the percentage of open area of the perforated plate is about 25%.

5. A device as in claim 1 wherein the stationary scraping means is in the form of a wheel having spokes and the spokes are arranged to remove granulates from the granulate connecting means as the plate and collection means rotate.

* * * * *